United States Patent
Fechtig et al.

[15] 3,697,515
[45] Oct. 10, 1972

[54] PROCESS FOR SPLITTING THE 7-N-ACYL GROUP FROM CEPHALOSPORIN COMPOUNDS

[72] Inventors: Bruno Fechtig, Binningen; Ernst Vischer, Basel; Hans Bickel, Binningen; Rolf Bosshardt, Arlesheim; Jakob Urech, Basel, all of Switzerland

[73] Assignee: Ciba-Geigy Corporation, Ardsley, N.Y.

[22] Filed: Nov. 19, 1971

[21] Appl. No.: 200,511

Related U.S. Application Data

[63] Continuation of Ser. No. 842,359, July 16, 1969, abandoned. Continuation-in-part of Ser. No. 493,223, Oct. 5, 1965, abandoned, which is a continuation-in-part of Ser. No. 344,803, Feb. 14, 1964, abandoned.

[30] Foreign Application Priority Data

| | | |
|---|---|---|
| Feb. 18, 1963 | Switzerland | 1992/63 |
| March 1, 1963 | Switzerland | 2675/63 |
| April 3, 1963 | Switzerland | 4249/63 |
| June 13, 1963 | Switzerland | 7358/63 |
| July 2, 1963 | Switzerland | 8246/63 |
| Oct. 2, 1963 | Switzerland | 12112/63 |
| Nov. 6, 1963 | Switzerland | 13600/63 |
| Jan. 22, 1964 | Switzerland | 730/64 |
| Oct. 9, 1964 | Switzerland | 13166/64 |
| Nov. 13, 1964 | Switzerland | 14696/64 |

[52] U.S. Cl. ........................260/243 C, 424/246
[51] Int. Cl. ................................C07d 99/24
[58] Field of Search ......................260/243 C

[56] References Cited

UNITED STATES PATENTS

3,499,909  3/1970  Weissenburger et al. .......................260/239.1

*Primary Examiner*—Nicholas S. Rizzo
*Attorney*—Harry Goldsmith et al.

[57] ABSTRACT

The present invention is directed to an improved process for splitting the N-acyl group in 7-position from cephalosporin type compounds. It is characterized by formation of the $N_7$-imide halide, conversion of the latter into the iminoether and splitting of the C=N double bond of the latter.

24 Claims, No Drawings

PROCESS FOR SPLITTING THE 7-N-ACYL GROUP FROM CEPHALOSPORIN COMPOUNDS

CROSS-REFERENCE TO RELATED APPLICATIONS

The present application is a continuation of our application, Ser. No. 842,359, filed July 16, 1969 (now abandoned) which in turn is a continuation-in-part of our application, Ser. No. 493,223, filed Oct. 5, 1965 (now abandoned), which itself is a continuation-in-part of our application, Ser. No. 344,803, filed Feb. 14, 1964 (now abandoned).

DESCRIPTION OF THE REFERRED EMBODIMENTS

The present invention provides a new process for the splitting of the 7-N-acyl group from a compound of the formula I

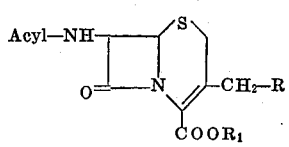

in which R represents an atom or a group which does not take part in the reaction and $COOR_1$ a blocked carboxyl group. The process is characterized in that a compound of the formula I is reacted, in the presence of a tertiary amine, with an agent forming an imide halide, the imide halide converted into an iminoether by means of an alcohol and the double C=N bond of the iminoether split with a compound containing a hydroxy group.

In the above starting compounds of formula I R means for instance an esterified hydroxyl group, e.g. a hydroxyl group esterified with a carboxylic acid, for instance an unsubstituted or substituted lower alkanoic acid, such as propionic acid, pivaloic acid, butyric acid, formic acid, chloracetic acid, especially acetic acid, or with an aromatic carboxylic acid such as benzoic or thiobenzoic acid or an aryl lower alkanoic acid such as phenylacetic acid or diphenylacetic acid. Other meanings of R are for instance a hydrogen atom or, taken together with $COOR_1$, the lacton group —CO—O—.

In the starting material the 7-N-acyl group is the acyl group of any mono- or dicarboxylic acid, especially the δ-aminoadipoyl group of which the free amino and carboxyl group are blocked.

Groups useful for the blocking of free amino and carboxyl groups occurring in 7-acyl radicals are known in the art, especially from the field of aminoacids and peptides. It should, however, be noted, that in the present reaction the whole acyl residue is split off and rejected and that therefore there is no need to use blocking groups which can be split off after the reaction has been carried out. Useful for blocking the amino group is, for example, a lower alkyl, aryl or acyl radical, advantageously a radical which reduces the basicity of the amino group. The aryl radicals, for example naphthyl or phenyl radicals, may be unsubstituted or substituted, for example by halogen atoms, nitro, cyano, sulfo, carbamoyl, esterified carboxyl, lower alkylcarbonyl or lower alkoxycarbonyl groups; especially suitable are the 2:4-dinitro-phenyl, the 2:4:6-trinitrophenyl, the 2:4-di-nitro-6-methoxy-phenyl, the 4-cyanophenyl and the 4-carbomethoxy-phenyl radical. Acyl radicals are more especially lower alkanoyl radical with one to six carbon atoms, for example acetyl, propionyl, butyryl, also aroyl radicals, such as benzoyl, as well as benzoyl substituted by nitro, cyano, sulfo groups, halogen atoms, lower alkyl or lower alkoxy groups, and preferably N:N-phthaloyl; further, aryl-lower alkanoyl radicals, such as phenylacetyl, or the carbobenzoxy or tertiary butyloxycarbonyl radical or the benzenesulfonyl or toluenesulfonyl radical may be used for blocking the amino group. The amino groups can also be blocked by portonation.

The free carboxyl group is, for instance, blocked by esterification. As in the case of amino groups occurring in the acyl radical, also a carboxyl group occurring in the acyl radical can be blocked in any suitable way and there is no critical point in this regard as the whole acyl residue is split off in the reaction. Thus, esters with hydroxy compounds can be used, for example, with alcohols such as unsubstituted or substituted alcohols or phenols. In most cases it will be preferred to start with compounds in which a carboxyl group occurring in the 7-acyl residue is blocked in the same way as the carboxyl group in 4-position of the dihydrothiazine ring. Hydroxy compounds suitable for that purpose are indicated for illustration below. It is, however, also possible, especially in the case of the δ-aminoadipolyl residue, to block the amino and carboxyl group together, for example by reaction with isocyanates or isothiocyanates with formation or a hydantoin or thiohydantoin ring.

If in the starting material of formula I the 7-acyl group is the blocked δ-aminoadipoyl group the compound is derived from Cephalosporin C. Other 7-acylamino-cephalosporanic acids or derivates thereof, respectively, can also be used as starting materials for the new process. Thus, the acyl group can be an aliphatic, aromatic, heterocyclic, araliphatic or heterocyclylaliphatic carboxylic acid radical, especially the acyl radical of naturally occurring 7-acylaminocephalosporanic acids and 6-acylaminopenicillanic acids [that can be prepared starting from naturally occurring cephalosporins or penicillins], for example cephalosporin C or 6-(δ-amino-adipoyl)-amino penicillanic acid, penicillin G, V, F dihydro-F, K, X or O. In the starting compounds of formula I the carboxyl group occurring in 4-position is blocked during the reaction with the imide halogenide forming agent. The purpose of the blocking is to avoid that the carboxyl group is halogenated by that agent, for instance phosphorpentachloride. As blocking group therefore any compound may be used, which converts the carboxyl group into a group not reacting with that agent. If the 7-desacylated compound shall be isolated in the form of the free carboxylic acid, a blocking group should be used which can be split off without destruction of the cephalosporin nucleus. Such blocking groups are, for instance, ester groups that can be split in an acidic or neutral or weakly basic (up to pH 9) reaction medium, for instance by reduction, solvolysis, for instance acid hydrolysis or photolysis. Advantageously, the carboxyl group is esterified with hydroxy compounds known in the field of aminoacids and peptides to be readily eliminable from the ester, especially in an non-alkaline medium. Such hydroxy compounds derive from elements of the fourth group (IV A) of the periodic system having an atom weight of at most 120, for instance from carbon, germanium or tin. For illustration may be named methanol substituted by at least one phenyl group which latter may be substituted by at least one phenyl group which latter may be substituted by one or more substituents selected from the group consisting of halogen atoms such as chlorine, bromine, fluorine, iodine, lower alkyl, lower alkoxy, especially methoxy, or the nitro group, for instance, benzylalcohol, diphenylmethanol, triphenylmethanol, para-methoxyphenyl-methanol 3,5-dimethoxy-benzylalcohol, di-para-methoxyphenyl-methanol, para-nitrobenzylalcohol, 2,4,6-trimethyl-benzylalcohol, 3,4-dimethoxy-6-nitro-benzylalcohol, α-phenyl-α-(3,4-dimethoxy-6-nitro-phenyl)-methanol, α-methyl-α-(3,4-dimethoxy-6-nitrophenyl)-methanol, further methanol substituted by three lower alkyl groups such as tert. butanol, tert. amylalcohol or ethanol, substituted by 3 halogen atoms in 2-position, e.g. trichlor-ethanol, tribromethanol; further 2-iodoethanol, tetrahydropyranol, stannylalcohol.

As mentioned above, the blocking group has to be present only during the step of formation of the imide halide. After that step it can be split off, if desired. This splitting can be effected by solvolysis, for instance with water or alcohols, if desired in an acidic or weakly alkaline medium, or by reduction, for instance with hydrogen in the presence of a catalyst or with metals such as zinc, or finally, by photolysis, preferably in a polar medium. It is also possible to retain the blocking group in the resulting 7-desacyl compound for further chemical reaction, such as conversion into another 7-acyl derivative desired because of its activity, and only thereafter to eliminate the blocking group. As is known, the 7-desacyl compound, for instance 7-amino-cephalosporanic acid, has practically no activity so that reacylation is necessary in any case. In some cases, the elimination of the blocking group after reacylation gives the active final product in better yield. Reacylation can be effected with an aliphatic, aromatic, heterocyclic, araliphatic or heterocyclylaliphatic carboxylic acid radical, especially the acyl radical of 7-acylamino-cephalosporanic acids and 6-acylamino-penicillanic acids that are known to be antibiotically effective, for example a radical of the formula $$R_2(CH_2)_nCO$$

in which $n$ represents an integer of 0 to 4, preferably 1, and in which a $CH_2$-group, especially in α-position may be substituted, for instance by amino, halogen, lower alkoxy, cyan, nitro or carboxyl, and $R_2$ represents an unsubstituted or substituted aryl, cycloalkyl, or heterocyclyl radical or an aryloxy, arylthio, cycloalkoxy, heterocyclyloxy or heterocyclylthio radical, the aryl or heterocyclyl radicals being monocyclic or dicyclic, for example, 2:6-dimethoxy-benzoyl, tetrahydronaphthoxyl, 2-methoxynaphthoyl, 2-ethoxy-naphthoxyl, 3-pyridyl-benzoyl, phenylacetyl, phenylglycyl, phenylalanyl, phenylcyanacetyl, p-chlorophenyl-cyanacetyl, phenoxyacetyl, S-phenyl-thioacetyl, S-bromophenyl-thio-acetyl, α-phenoxypropionyl, β-phenoxypropionyl, α-phenoxy-phenylacetyl, α-methoxyphenylacetyl, α-methoxy-3:4-dichlorophenyl-acetyl, pyridyl(3)-acetyl, pyridyl(2)-acetyl, 1-methyl-imidazolyl(2)-thioacetyl, 1,2,4-triazolyl(3)-thioacetyl, thiozolinyl(2)-thioacetyl, imidazolinyl(2)-thioacetyl, 1-methyl-imidazolyl(3)-acetyl, imidazolyl(1)-acetyl, benzyloxy-carbonyl, S-benzylthioacetyl, S-benzylthiopropionyl, hexahydrobenzyloxycarbonyl, cyclopentanoyl, cyclohexanoyl, 2-thienylacetyl, 2-thienyl-cyanacetyl, 3-thienylacetyl, 2-furylacetyl, 2-indoylacetyl, 2-phenyl-5-methyl-isoxazolyl-carbonyl, 2-(2'-chlorophenyl)-5-methyl-isoxazolyl carbonyl, indenyl-carbonyl, or a radical of the formula $$C_nH_{2n+1}CO \text{ or } C_nH_{2n-1}CO$$

in which $n$ represents an integer of 1 to 7, and the chain is straight or branched and, if desired, is interrupted by an oxygen atom or a sulfur atom or is substituted, for instance, by halogen, cyan, carboxy, carbalkoxy, lower alkoxy, nitro or amino, for example, a propionyl, butyryl, hexanoyl, octanoyl, butylthioacetyl, acrylyl, α-cyano-β-dimethyl-acroyl, crotonyl, 2-pentenoyl, allylthioacetyl, chloracetyl, β-bromopropionyl, dichloracetyl, dibromacetyl, difluoroacetyl, ethoxycarbonylacetyl, dimethoxycarbonylacetyl, cyanacetyl, α-cyanopropionyl, nitroacetyl, aminoacetyl, or α-carboxylpropionyl radical.

A blocking ester group can also be retained if it is split enzymatically in the tissue on administration of the compound. The following scheme illustrates the splitting of the 7-acyl group from a specific Cephalosporin C starting material.

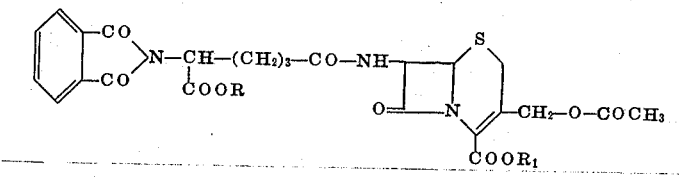

↓ PCl₅, pyridine

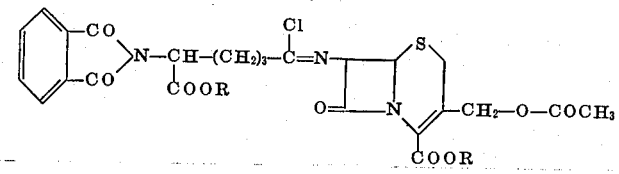

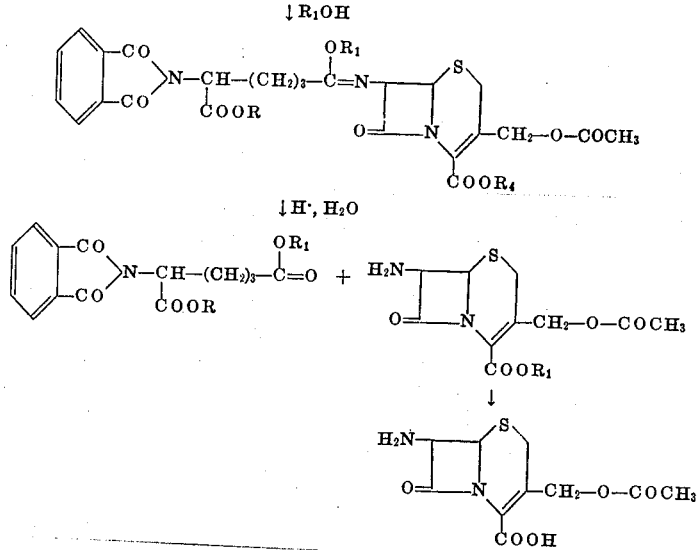

Agents forming imide halides are, more especially acid halides, particularly chlorides, which are derived from phosphorus, sulfur, carbon or their oxygen acids, for example phosphorus oxychloride, phosphorus pentachloride, phosphorus trichloride, thionyl chloride, phosgene, oxalyl chloride, brenzcatechyl-phosphorus trichloride.

The reaction of the cephalosporin starting compound with the above-mentioned agent capable of forming an imide halide is carried out in the presence of a tertiary amine, for example triethylamine, ethyl-diisopropylamine, N-methyl-morpholine, chinoline, isochinoline, or especially pyridine or dimethylaniline.

According to the invention the amide halide is reacted with an alcohol in the presence of such a tertiary amine to form an iminoether. Alcohols are, for example, lower alkanols such as ethanol, n-propanol, isopropanol, n-butanol, especially methanol, or phenyl-lower alkanols for instance benzylalcohol. The iminoether is an intermediate which need not be isolated but can be split in the same reaction medium.

The splitting of the C=N double bond of the iminoether to form the compound of formula I is carried out with a compound containing a hydroxyl group such as water or an alcohol, for instance that used for forming the iminoether, or with a mixture of alcohol with water, preferably at a pH from 0 to 4.

A preferred feature of the above process is reacting N,N-phtphaloyl-cephalosporin C-dibenzhydryl ester with phosphorus pentachloride, treating the resulting imide chloride with a lower alkanol to form a lower alkanol iminoether, hydrolyzing the iminoether with water in the presence of an acidic agent, especially dilute aqueous hydrochloric acid, and hydrolyzing the resulting 7-amino-cephalosporanic acid benzhydryl ester with trifluoroacetic acid in the presence of anisole.

1. The reaction of N,N-phthaloyl-cephalosporin C-di-benzhydryl ester with phosphorus pentachloride is carried out in an inert solvent, preferably methylene chloride. As tertiary amine, there may be used advantageously pyridine. The molar proportion of the cephalosporin derivative: phosphorus pentachloride: pyridine is preferably about 1:3:12. The temperature should be about −20° to −10° C. Under these circumstances the reaction time is 30 to 40 minutes.

2. In order to transform the imide chloride as fast and as quantitatively as possible into the iminoether, a large excess of alcohol, for instance about 100 mols of methanol per mol of imidechloride is used and the reaction is carried out first at −20° to −10° C (about 30 minutes) and then for about 1 hour at room temperature.

3. The hydrolysis of the iminoether to form the 7-amino-cephalosporanic acid-benzhydryl ester is preferably carried out in a mixture of methylene chloride and water, for instance with dilute aqueous hydrochloric acid in methylene chloride. Under these circumstances it is terminated within 45 minutes at room temperature.

It is to be noted that the afore-mentioned steps 1 to 3 are all carried out in the same solvent, methylene chloride, and in the same reaction vessel. After the third step the reaction mixture is made alkaline (pH about 8) and the 7-amino-cephalosporanic acid benzhydryl ester isolated from the methylene chloride phase as crude product, It can be reacted, without further purification, with trifluoroacetic acid in anisole.

When the benzhydryl ester has been hydrolyzed, a polar solvent and a tertiary amine are added until the acid is neutralized, and 7-amino-cephalosporanic acid crystallized from the solution. The trifluoroacetate formed with the tertiary amine should be soluble in the solvent. As solvents there may be used, for instance, dimethylformamide, acetonitrile, preferably lower alkanols, especially methanol. The tertiary amine is preferably a tri-lower alkylamine, especially triethylamine or tri-n-butylamine. 7-Amino-cephalosporanic acid which crystallizes out of the solvent is separated and washed, preferably first with methanol, then with methylene chloride and then ether. The product is thus obtained in a purity of more than 97 percent without being recrystallized.

The following Examples illustrate the invention.

EXAMPLE 1

A solution of 674 mg (1 millimol) of crystalline phenylacetyl-cephalosporin C-dibenzyl ester in a mixture of 20 ml of methylene chloride and 674 mg (6 millimols) of pyridine is mixed with a solution of 308 mg (2 millimols) of phosphorus oxychloride in 15 ml of methylene chloride; the whole is kept for 16 hours at 23° C, then mixed with 2 ml of absolute ethanol and left to itself for a further 6 hours. The mixture is then evaporated under 0.1 mm Hg. pressure and hydrolyzed in 20 ml of dioxan with 10 ml of aqueous phosphoric acid of 5 percent strength for 19 hours at 20° C. The batch is diluted with water, the dioxan expelled under vacuum, and the aqueous phase adjusted with solid tripotassium phosphate to pH = 3.3 and extracted three times with chloroform+ether (1:3). The organic phases are washed with phosphate buffer (pH = 3.3) and extracted three times with phosphoric acid of 3 percent strength. The chloroform+ether extract contains 540 mg of starting material (identified by thin-layer chromatogram on silica gel in systems I and II; see Table I). After the aqueous solution (pH = 3.3) has been adjusted to pH 8.5, 19.9 mg of cephalosporin C-dibenzyl ester are extracted with ethyl acetate (identified in the thin-layer chromatogram in systems I and II by comparison with authentic material which is obtained from cephalosporin C by conversion into N-tertiary butyloxycarbonyl-cephalosporin C, esterification to form the dibenzyl ester and elimination of the tertiary butyloxycarbonyl group with trifluoracetic acid; see Table I).

The phosphoric acid aqueous extract is adjusted with tripotassium phosphate to pH = 8.5 and extracted with ethyl acetate. The organic phase is dried with sodium sulfate and evaporated to dryness. The residue (47 mg) is unitary in the thin-layer chromatogram in systems I and II and consists of 7-amino-cephalosporanic acid benzyl ester; see Table I. The infrared absorption spectrum in methylene chloride displays, inter alia, bands at 2.83 m$\mu$ (NH$_2$ group), 5.62 m$\mu$ ($\theta$-lactam) and 5.77 m$\mu$ (ester) but, in contrast to the starting material, no bands appear at 2.98, 5.95 and 6.70 6.70 m$\mu$.

In order to identify the structure of 7-amino-cephalosporanic acid benzyl ester a crystalline derivative was prepared which was identified with authentic material:

400 mg (1.1 millimol) 7-amino-cephalosporanic acid benzyl ester are reacted in 10 ml of methylene chloride in the presence of 50 mg (0.6 millimol) of pyridine with 126 mg (1.2 millimols) of chlorethyl isocyanate for 17 hours at 22° C. The batch is evaporated in vacuo, the residue taken up in chloroform+ether (1:3) and washed with aqueous phosphoric acid of 5 percent strength and aqueous dipotassium hydrogen phosphate solution of 10 percent strength. The neutral extract is dried over sodium sulfate, evaporated in vacuo and recrystallized from acetene+ether to yield 461 mg (= 90 percent of the theoretical yield) of 7-($\beta$-chlorethylureido)-cephalosporanic acid benzyl ester in the form of colorless needles; melting point: 175°– 177° C; optical rotation $[\alpha]_D^{20}$ =+ 11° ± 1° (c = 1, chloroform), ultraviol absorption spectrum: $\lambda_{max}$ 264 m$\mu$ ( $\epsilon$ = 8100). The product is identical with material synthetized from 7-amino-cephalosporanic acid.

TABLE I

|  | Thin-layer chromatogram on silica gel: | | |
| --- | --- | --- | --- |
|  | N-phenyl-acetyl-cephalosporin C-dibenzyl ester | Cephalosporin C-dibenzyl ester | 7-amino-cephalosporanic acid benzyl ester |
| System I: n-butanol-acetic acid 10:1, saturated with water | $R_f = 0.76$ | $R_f = 0.52$ | $R_f = 0.57$ |
| System II: Benzeno:acetone 6:4 | $R_f = 0.58$ | $R_f = 0.16$ | $R_f = 0.55$ |
| Indicator: Ninhydrin-collidine | flesh colored | reddish violet | greyish yellow |
| Indicator: Iodine-starch | positive | positive | positive |

The iodine-starch reagent was prepared as described by R. Thomas in Nature 191, page 1161 [1961].

By hydrogenation in glacial acetic acid in the presence of palladium carbon of 10 percent strength, 7-amino-cephalosporanic acid benzyl ester is transformed into 7-amino-cephalosporanic acid.

The phenylacetyl cephalosporin C-dibenzyl ester used as starting material may be prepared as follows:

534 mg (1 millimol) of N-phenylacetyl-cephalosporin C in 50 ml of dioxan are esterified with 2.5 millimols of phenyldiazomethane in 15 ml of ether for 1 hour at 22° C. The batch is evaporated in vacuo, taken up in chloroform+ether (1:3) and washed with aqueous phosphoric acid of 10 percent strength, aqueous dipotassium hydrogenphosphate solution of 10 percent strength and saturated sodium chloride solution. The evaporated organic phase is triturated with ether and yields 539 mg of N-phenylacetyl cephalosporin C-dibenzyl ester which is sparingly soluble in ether and which is crystallized from acetone; m.p. = 156°– 157° C.

EXAMPLE 2

200 mg (0.3 mmol) of crystalline N-phenylacetyl-cephalosporin C-dibenzyl ester in 13 ml of methylene chloride are allowed to react at 22° C for 4 days with 100 mg (0.65 mmol) of phosphorus oxychloride and 158 mg (2 mmol) of pyridine under moisture seal in an atmosphere of nitrogen. After the addition of 1 ml of absolute alcohol, the reaction mass is allowed to stand for another 7 hours. Working up as described in Example 1 yields 155 mg of starting material, 9.5 mg of cephalosporin C-dibenzyl ester, and 31.0 mg of pure 7-amino-cephalosporanic acid-benzyl ester.

In an analogous manner the dimethyl, diethyl and di-n-butyl ester of N-phenylacetyl-cephalosporin C are con-verted into the corresponding 7-amino-cephalosporanic acid esters. The latter have the following $R_f$ values in the paper chromatogram, system I (n-butanol+acetic acid 10:1, saturated with water) : methyl ester : Rf I = 0.13; ethyl ester: $R_f$ I = 0.15; n-butyl ester : $R_f$ I = 0.16; yellowish brown coloration with ninhydrin+collidine or bioautographic identification with Staph. aureus after sprinkling with 1-molar pyridine in acetone+water (1:1) and 1 percent phenyl-acetyl chloride in acetone. The ultraviolet spectrum shows a maximum at 263 m$\mu$( $\epsilon$ = 8000).

The diesters used as starting material are prepared by reacting N-phenylacetyl-cephalosporin dissolved in methanol with a 5 percent ethereal solution of diazomethane, diazoethane or diazobutane. The $R_f$ values of N-phenylacetyl-cephalosporin C-diesters in the paper chromatogram in the system I (n-butanol+acetic acid (10:1), saturated with water) and system III (n-butanol, saturated with water + 1 percent glacial acetic acid) respectively are: dimethyl ester : $R_f$ III = 0.76; diethyl ester : $R_f$ I = 0.85; dibutyl ester: $R_f$ III

EXAMPLE 3

406 mg (0.59 mmol) of crystalline N-carbobenzoxy-cephalosporin C-debenzyl ester in 20 ml of methylene chloride are mixed with 316 mg (4.0 mmol) of pyridine and 200 mg (1.3 mmol) of phosphorus oxychloride and the mixture allowed to stand at 25° C for 88 hours with exclusion of moisture and light. The mixture is then treated with 2 ml of absolute alcohol, left to itself for another 8 hours, treated with 1 ml of pyridine, and evaporated under reduced pressure. For hydrolysis, the residue is taken up in 20 ml of dioxan and 10 ml of 2 percent aqueous phosphoric acid, and allowed to stand at 22° C for 15 hours. Working up as described in Example 1 yields 65 mg (0.179 mmol) of pure 7-amino-cephalosporanic acid-benzyl ester.

The N-carbobenzoxy-cephalosporin C-dibenzyl ester used as starting material is prepared as follows:

4.73 g (10 millimols) of cephalosporin C-sodium salt are dissolved in 200 ml of aqueous sodium bicarbonate solution of 10 percent strength and slowly treated with 150 ml of acetone and at 0° C with a solution of 2.30 g. (13.5 millimols) of chloroformic acid benzyl ester in 50 ml of acetone. The batch is stirred for 30 minutes at 0° C, for 1 hour at 22° C, and the acetone is then evaporated in vacuo. The aqueous phase is first washed with ethyl acetate, then at a pH value of 2.0 extracted with ethyl acetate while being salted out (sodium chloride). The extract is dried over sodium sulfate and evaporated to yield 4.437 g of N-carbo-benzoxy-cephalosporin C. Thin-layer chromatogram on silica gel in system I : $R_f = 0.30$.

4.42 g (8.05 millimols) of N-carbobenzoxy-cephalosporin C are dissolved in 100 ml of dioxan, treated with 110 ml of a solution of 19.8 millimols of phenyldiazomethane in dioxan and allowed to react for 1 ½ hours at 22° C. The batch is then evaporated to dryness in vacuo and the residue triturated with petroleum ether+ether (1:1). The insoluble portion is taken up in chloroform+ether (1:3) and washed with 2N-sodium bicarbonate. The organic phase is dried over sodium sulfate, evaporated (4.96 g) and crystallized from acetone+ether to yield crystalline N-carbobenzoxy-cephalosporin C-dibenzyl ester melting at 133°–135° C.

EXAMPLE 4

216 mg (0.296 mmol) of crystalline N-2,4-dinitrophenyl-cephalosporin C-dibenzyl ester in 11 ml of methylene chloride are mixed with 158 mg (2.0 mmol) of pyridine and 100 mg (0.65 mmol) of phosphorus oxychloride and the mixture kept at 23° C for 8 days with exclusion of moisture and light. After the addition of 2 ml of absolute alcohol, the mixture is allowed to stand for another 8 hours, then treated with 1 ml of pyridine, and evaporated to dryness under reduced pressure. The residue is hydrolyzed for 16 hours at 22° C with a mixture of 20 ml of dioxan and 10 ml of 3 percent aqueous phosphoric acid. Working up in a manner analogous to that described in Example 1 yields 62 mg (0.171 mmol = 58 percent of theory) of pure 7-amino-cephalo-sporanic acid-benzyl ester.

The N-2:4-dinitrophenyl-cephalosporin C-dibenzyl ester used as starting material may be prepared as follows:

11.63 g of N-2:4-dinitrophenyl-cephalosporin C are dissolved in 125 ml of dioxan and treated with 250 ml of a phenyldiazomethane solution of 2% strength for 25 minutes at 22° C with stirring. When the addition is complete, the batch is allowed to stand for 20 minutes and then concentrated extensively in vacuo. The residue is taken up in chloroform and then washed three times each with 2N-hydrochloric acid, N-sodium bicarbonate and water. The organic phase is dried and evaporated to yield 15.54 g of crude product. The latter is triturated with ether to remove the portions soluble in ether (2.42 g). The portions which are insoluble in ether (12.84 g) are crystallized from acetone+ether to yield 9.98 g of crystalline N-2:4-dinitrophenyl-cephalosporin C-dibenzyl ester which on recrystallization melts at 109° – 111° C; optical rotation $[\alpha]_D^{25} = +31.5° \pm 1°$ (c = 1 in chloroform).

In an analogous manner the dimethyl, diethyl and di-n-butyl ester of N-2:4-dinitro-phenyl-cephalosporin C are converted into the 7-amino-cephalosporanic acid methyl ester, the 7-amino-cephalosporanic acid ethyl ester and the 7-amino-cephalosporanic acid n-butyl ester respectively.

The diesters used as starting materials may be prepared by reacting a methanolic solution of N-2:4-dinitrophenyl-cephalosporin C with a 5 percent ethereal solution of diazomethane, diazoethane or diazobutane.

The $R_f$ values of the N-2:4-dinitrophenyl-cephalosporin C-diesters in the paper chromatogram in systems I and III are: dimethyl ester : $R_f I = 0.73$; $R_f III = 0.76$; diethyl ester : $R_f I = 0.78$; dibutyl ester: $R_f I = 0.82$; $R_f III = 0.85$. Melting point: 103°–104° C.

EXAMPLE 5

216 mg (0.296 millimol) of crystalline N-2:4-dinitrophenyl-cephalosporin C-dibenzyl ester in 11 ml of methylene chloride are allowed to stand in the dark with 158 mg (2.0 millimols) of pyridine and 100 mg (0.65 millimol) of phosphorus oxychloride for 8 days at 20° C with the exclusion of moisture. 2 ml of absolute alcohol are added, and the bath is allowed to stand for another 8 hours, after which a mixture of 26 ml of dioxan and 13 ml of aqueous phosphoric acid of 5 percent strength are added. The solution is freed from methylene chloride in vacuo until there is only one phase and then allowed to stand for 16 hours at 22° C for hydrolysis. The batch is diluted with water, freed from organic solvent in vacuo, adjusted to a pH value of 3.3 and extracted with a mixture of benzene and ethyl acetate (2:1). The organic phase is extracted with aqueous phosphorus acid of 3 percent strength and the phosphoric acid solution is adjusted to a pH value of 8.5 and extracted with ethyl acetate. The ethyl acetate extract is dried over sodium sulfate and evaporated to yield 53 mg (= 49 percent of the theoretical yield) of pure 7-amino-cephalosporanic acid benzyl ester.

EXAMPLE 6

If 2 ml of methanol are used instead of 2 ml of ethanol, the remaining conditions and procedure being the same as those described in Example 5, 59 mg (= 55 percent of the theoretical yield) of 7-amino-cephalosporanic acid benzyl ester are obtained.

EXAMPLE 7

203 mg (0.296 millimol) of N-phthaloyl-cephalosporin C-dibenzyl ester are allowed to react in methylene chloride with pyridine and phosphorus oxychloride, as described in Example 5, and hydrolyzed and worked up as described in that Example. 48 mg (= 45 percent of the theoretical yield) or pure 7-amino-cephalosporanic acid benzyl ester are obtained.

The N-phthaloyl-cephalosporin C-dibenzyl ester may be prepared as follows:

473 mg (1 millimol) of cephalosporin C are taken up in 10 ml of an aqueous dipotassium hydrogen phosphate solution of 10 percent strength and the pH value of the mixture is adjusted to 9 with tripotassium phosphate. 4 ml of acetone are added and then, with stirring, 6 ml of acetone containing 285 mg (1.3 millimols) of N-carbethoxy-phthalimide, and the batch is stirred for 1 hour at 22°C, the pH value being kept constant by the addition of further tripotassium phosphate. The batch is then diluted with water, the pH value is adjusted to 7 with phosphoric acid, the acetone is removed in vacuo and the aqueous solution washed three times with ethyl acetate. The aqueous phase is then adjusted to pH 2 with phosphoric acid and the product extracted with ethyl acetate. The extract is dried over sodium sulfate and evaporated to yield 505 mg (= 93 percent of the theoretical yield) of N-phthaloyl-cephalosporin C.

According to the thin-layer chromatogram on silica gel in system I the product is unitary; $R_f = 0.21$ (colorless spot on a violet background after sprinkling with iodine starch reagent; method: R. Thomas, Nature 191, 1161 [1961]).

5 g (9.16 millimols) of N-phthaloyl-cephalosporin C are dissolved in 100 ml of dioxan and treated with stirring with 160 ml of an ethereal solution of 22 millimols of phenyldiazomethane and allowed to react for half an hour. After the addition of 2 ml of glacial acetic acid, the batch is evaporated in vacuo, taken up in chloroform+ether (1:3) and washed in succession with aqueous phosphoric acid of 5 percent strength, aqueous dipotassium phosphate solution of 10 percent strength and saturated, aqueous sodium chloride solution. The organic phase is dried over magnesium sulfate to yield 8.52 g of evaporation residue which is digested first with petroleum ether then with ether. The residue (5.06 g) which is insoluble in both solvents is N-phthaloyl-cephalosporin C-dibenzyl ester. The product is unitary according to the thin-layer chromatogram on silica gel (system II : $R_f = 0.74$) and absorbs in the ultraviolet absorption spectrum at 264 m$\mu$ ($\epsilon = 8200$).

EXAMPLE 8

660 mg (1 millimol) of N-benzoyl-cephalosporin C-dibenzyl ester in 40 ml of methylene chloride are allowed to stand with 593 mg (7.5 millimols) of pyridine and 368 mg (2.4 millimols) of phosphorus oxychloride for 7 days at 25° C with the exclusion of light and moisture. 7 ml of absolute ethanol are then added, the reaction mixture is allowed to stand for another 8 hours, 3 ml of pyridine are added and the whole evaporated in vacuo. For the purpose of hydrolysis the residue is taken up in 70 ml of dioxan and 35 ml of aqueous phosphoric acid of 3 percent strength and allowed to stand for 15 hours at 22° C. The bath is worked up as described in Example 1 and yields 114 mg (= 32 percent of the theoretical yield) of pure 2-amino-cephalosporanic acid benzyl ester.

The N-benzoyl-cephalosporin C-dibenzyl ester used as starting material may be prepared as follows:

A solution of 5 g (10.5 millimols) of cephalosporin C-sodium salt in 150 ml of aqueous dipotassium hydrogen phosphate solution of 10 percent strength is treated with 100 ml of acetone and at 0° – 5° C slowly with a solution of 2.1 g (15 millimols) of benzoyl chloride in 21 ml of acetone. The batch is allowed to stand for half an hour at 0° – 5° C and for half an hour at 22° C (water-bath) and the acetone is then removed in vacuo. The aqueous phase is washed with ethyl acetate, washed at a pH value of 3.3 with benzene and finally extracted at a pH value of 2.0 with ethyl acetate. The extract is dried over sodium sulfate and evaporated to yield 4.24 g (= 78 percent of the theoretical yield) of N-benzoyl-cephalosporin C which crystallizes from ethyl acetate in the form of needles melting at 113° – 117°C.

For the purpose of esterification 3.5 g (6.7 millimols) of N-benzoyl-cephalosporin C are dissolved in 150 ml of dioxan and allowed to react for 45 minutes with a solution of 13.5 millimols of phenyldiazomethane in 90 ml of ether. The reaction mixture is evaporated, taken up in a mixture of chloroform and ether (1:3) and washed in succession with aqueous phosphoric acid of 10 percent strength, aqueous dipotassium hydrogen phosphate solution of 10 percent strength and saturated sodium chloride solution. The organic phase is dried and evaporated and the residue triturated with ether to yield 4.35 g of N-benzoyl-cephalo-sporin C-dibenzyl ester which crystallizes from acetone and melts at 178° – 181° C.

EXAMPLE 9

746 mg (1 millimol) of N-phthaloyl-cephalosporin C-di-(para-methoxy-benzyl ester) in 40 ml of methylene chloride are reacted with 538 mg (6.8 millimols) of pyridine and 338 mg (2.2 millimols) of phosphorus oxychloride at 22° C for 8 days. The batch is allowed to stand for 8 hours at 22° C with 6 ml of alcohol and then treated with 120 ml of a mixture of dioxan and water (2:1) for the purpose of hydrolysis. The hydrolysis is carried out as described in Example 5 and the reaction mixture worked up with a mixture of benzene and ethyl acetate (5:2) to yield 184 mg (= 48 percent of the theoretical yield) of 7-amino-cephalosporanic acid para-methoxy-benzyl ester. Thin-layer chromatogram on silica gel in system II : $R_f = 0.50$; in system I : $R_f = 0.72$. The ester is split off to form 7-amino-cephalosporanic acid by subjecting the product to 5 minutes' reaction with anhydrous trifluoracetic acid.

The N-phthaloyl-cephalosporin C-di-(para-methoxy-benzyl ester) used as starting material may be prepared as follows:

2.73 g (5 millimols) of N-phthaloyl-cephalosporin C and 1.66 g (12 millimols) of anisyl alcohol are dissolved in 30 ml of dioxan. After cooling to 10° C, a solution of 2.88 g (14 millimols) of dicyclohexyl carbodiimide in 20 ml of dioxan is added in one portion, the mixture is allowed to stand for 30 minutes at 10° C and for 1 hour at room temperature. The dicyclohexylurea formed is filtered off, the filtrate lyophilized, the residue taken up in a mixture of benzene and ethyl acetate (5:2), washed four times with aqueous secondary potassium phosphate solution of 10 percent strength and twice with a sodium chloride solution. The extract is dried over sodium sulfate and evaporated to yield 3.44 g (92.4 percent) of N-phthaloyl-cephalosporin C-di-(para-methoxy-benzyl ester). The product is taken up in a mixture of benzene and petroleum ether (6:4) and purified on silica gel (Merck). The substance can be eluted with benzene+chloroform (2:8).

According to the thin-layer chromatogram on silica gel in n-butyl acetate as eluant the product is unitary; $R_f = 0.55$ (colorless spot on a violet background after sprinkling with iodine starch reagent; cf. R. Thomas, Nature 191, 1161 [1961]).

The substance crystallizes in the form of clusters from methylene chloride=petroleum ether; m.p. 124° – 127° C. Ultraviolet absorption spectrum in rectified spirit: $\epsilon_{max}$ 258 m$\mu$ ( $\epsilon = 8700$).

EXAMPLE 10

2.63 g (3 millimols) of crystalline N-phthaloyl-cephalosporin C-dibenzhydryl ester are allowed to react in 110 ml of methylene chloride for 10 days at 20° C with 1.58 g (20 millimols) pyridine and 1.00 g (6.5 millimols) of phosphorus oxychloride. 20 ml of methanol are added to the reaction mixture which is then allowed to stand for another 8 ½ hours. 260 ml of dioxan and 130 ml of aqueous phosphoric acid of 5 percent strength are then added, shaken for a short time and then concentrated in vacuo until the mixture is homogeneous. The batch is allowed to stand for 15 hours at 22° C, diluted with 50 ml of water, and the dioxan evaporated in vacuo. The aqueous phase (140 g) is treated with 70 ml of alcohol and extracted three times with a mixture of benzene and ethyl acetate (5:2). The organic phases are washed four times with 2N-hydrochloric acid+ alcohol ( 2:1). The combined aqueous phases are neutralized to a pH value of 6, freed from alcohol in vacuo, and extracted at pH 8.0 with ethyl acetate, dried over sodium sulfate and then evaporated. 871 mg (= 66 percent of the theoretical yield) of 7-amino-cephalosporanic acid benzhydryl ester are obtained. The infrared absorption spectrum (methylene chloride) displays in the carbonyl zone bands at 5.63, 5.76 and 5.78 $\mu$ (shoulder only). In the thin-layer chromatogram on silica gel in system I the $R_f$ = 0.58 and in the system benzene+acetone (7:3) : $R_f$ = 0.51.

The N-phthaloyl-cephalosporin C-dibenzhydryl ester used as starting material may be prepared as follows:

a. 1.09 g (2 millimols) of N-phthaloyl-cephalosporin C (purity about 78 percent) are dissolved in 16.5 ml of dioxan and treated with 776 mg (4 millimols) of diphenyl-diazomethane in 12 ml of dioxan. The deep purple-violet reaction solution is allowed to stand for 5 hours in the dark at 22° C. The solution which is now only pale pink is evaporated in vacuo, the residue taken up in 200 ml of chloroform, washed twice with ice-cold N-sodium bicarbonate and finally with sodium chloride solution of 10 percent strength. The chloroform extract dried with sodium sulfate is evaporated in vacuo and the residue (1.66 g) triturated three times with 20 ml of ether. The digestion residue (1.23 g) is recrystallized from acetone+di-n-propyl ether to yield 1.12 g of N-phthalyl-cephalosporin C-dibenzhydryl ester melting at 158.5° – 160° C. Infrared absorption spectrum in Nujol: bands inter alia at 3.05 $\mu$, 5.62 $\mu$, 5.71 $\mu$, 5.80 $\mu$, 6.00 $\mu$, 6.07 $\mu$ (shoulder), 6.44 $\mu$, 6.85 $\mu$ (broad), 7.26 $\mu$, 7.66 $\mu$, 7.90 $\mu$ and 8.21 $\mu$.

Ultraviolet absorption spectrum in ethanol : $\lambda_1$ max 259 m$\mu$ ( $\epsilon = 9100$), $\lambda_2$ max 264 m$\mu$ ( $\epsilon = 9100$).

$R_f$ values in the thin-layer chromatogram on silica gel: system benzene+acetone (8:2) : 0.49; system cyclohexane+ethyl acetate (1:1):0.28.

Reaction according to Reindel and Hoppe grey-violet. Reaction with iodine starch-acetic acid (according to R. Thomas, oc.cit.): weakly positive.

b. 10 g (18.3 millimols) of N-phthaloyl-cephalosporin C are dissolved in 150 ml of a mixture of dioxan and methanol (9:1) and treated at 20° C with stirring for half an hour with a clear-filtered solution of 8.5 g (43.8 millmols) of diphenyldiazomethane in 50 ml of petroleum ether. 20 ml of methanol are then added and the batch is stirred for another hour, evaporated in vacuo, crystallized from ethyl acetate and the crystals washed with ether. The yield of crystalline N-phthaloyl-cephalosporin C-dibenzhydryl ester is 84 percent of the theoretical yield; colorless needles; m.p. 160° – 161° C.

EXAMPLE 11

The 7-amino-cephalosporanic acid benzhydryl ester obtained as described in Example 10 may be hydrolyzed as follows:

438 mg (1 millimol) of 7-amino-cephalosporanic acid benzhydryl ester are dissolved in 5 ml of anisole, treated with 20 ml of anhydrous trifluoracetic acid and after 5 minutes rapidly evaporated under 0.1 mm pressure of mercury. The residue taken up in ethyl acetate is extracted with aqueous trifluoracetic acid of 1 percent strength. The aqueous phase is adjusted to a pH value of 3.5 with pyridine, then highly concentrated in vacuo to yield 248 mg (=91% of the theoretical yield) of 7-amino-cephalosporanic acid. According to the thin-layer chromatogram on silica gel in the system: n-butanol+pyridine++water
(30:20:6:24); $R_f$ = 0.45; brown coloration with ninhydrin-collidine) the product is unitary and identical with authentic material. The microbiological plate test (Staphylococcus aureus) shows the same inhibition zones after phenylacetylation.

For further characterization the 7-amino-cephalosporanic acid benzhydryl ester is converted into the 7-($\beta$-chlorethylureido)-cephalosporanic acid benzhydryl ester is converted into the 7-($\beta$-chloroethylureido)-cephalosporanic acid benzyhydryl ester in a manner analogous to that described in Example 1. According to the thin-layer chromatogram on silica gel in the system benzene+acetone (8:2) $R_f$ = 0.32, the product is unitary and identical with the product which is prepared from authentic 7-amino-cephalosporanic acid by reaction with chlorethyl isocyanate and subsequent esterification with diphenyl-diazomethane. This ester too may be hydrolyzed easily to the free carboxylic acid with trifluoracetic acid as described above.

EXAMPLE 12

2.63 g (3 millimols) of crystalline N-phthaloyl-cephalosporin C-dibenzhydryl ester are dissolved in 100 ml of methylene chloride, treated with 2.4 ml (30 millimols) of pyridine and, with cooling, with 12.5 ml of a 10 percent solution of phosphorus pentachloride (6 millimols) in methylene chloride. The reaction mixture is allowed to stand for 20 minutes at 20° C, 20 ml of methanol are added with cooling, and the batch allowed to stand for another 6 hours. The mixture is then poured on to well stirred 450 ml of dioxan+aqueous phosphoric acid of 5 percent strength (2:1), the methylene chloride is removed in vacuo until the solution is homogeneous, and the batch hydrolyzed for 15 hours at 22° C. The batch is worked up as described in Example 10 but with 2N-hydrochloric acid+alcohol (1:1) instead of (2:1) to yield 1.114 g of crude product from which by trituration with ether 710 mg (= 54 percent of the theoretical yield) of pure 7-amino-cephalosporanic acid benzhydryl ester are obtained. The product crystallizes from ether to form needles combined in clusters:melting point: 122° – 124° C. The product may be hydrolyzed to 7-amino-cephalosporanic acid as shown in Example 11.

EXAMPLE 13

26.3 g (0.03 mol) of crystalline N-phthaloyl-cephalosporin C-dibenzhydryl ester are dissolved in 1 liter of absolute methylene chloride, treated with 29.0 ml (0.36 mol) of pyridine and, with cooling, with 187 ml of a 10 percent solution of phosphorus pentachloride (0.09 mol) in methylene chloride. The reaction mixture is allowed to stand for half an hour in a water bath at 20° C, 200 ml of methanol are added with cooling and the batch allowed to stand for another 6 hours. The reaction solution is then poured on to a well stirred mixture of 1.3 liters of dioxan and 0.5 liter of aqueous phosphoric acid of 7percent strength, the methylene chloride is removed in vacuo until the solution is homogeneous, which is then hydrolyzed for 17 hours at 22° C. Working up as described in Example 12 yields 17.7 g of crude 7-amino-cephalosporanic acid benzhydryl ester which is hydrolyzed immediately. The product is taken up in 17 ml of anisole, treated with cooling with 85 ml of trifluor-acetic acid and then evaporated under 0.1 mm pressure of mercury. The contact time with the acid is about 15 minutes. A solution of the evaporation residue in 100 ml of ethyl acetate and about 30 ml of aqueous tripotassium phosphate solution of 50 percent strength are simultaneously poured into 100 ml of stirred aqueous dipotassium hydrogen phosphate solution of 3 percent strength (final pH value = 6.5). The two phases are separated and the lower one extracted with 2 portions of ethyl acetate. The ethyl acetate extracts are washed twice with aqueous dipotassium hydrogen phosphate solution of 3 percent strength, the combined aqueous phases are adjusted to a pH value of 3.5 with concentrated hydrochloric acid and the solution, concentrated to about 100 ml, is crystallized at 0°C to yield 6.14 g (= 75percent of the theoretical yield) of pure 7-amino-cephalosporanic acid. Ultraviolet absorption spectrum (in 0.1N-sodium bicarbonate solution):$\lambda_{max}$ 263 m$\mu$ ($\epsilon$ = 8300). $[\alpha]_d = + 118°$ (C = 1 in 0.5 N-sodium bicarbonate).

EXAMPLE 14

In an analogous manner to that described in Example 13 N-phthaloyl-cephalosporin C-di-tetrahydropyran-2-yl ester can be converted into 7-amino-cephalosporanic acid tetrahydropyran-2-yl ester. In the thin-layer chromatogram in system II the $R_f = 0.41$.

The starting material may be prepared as follows:

2.73 g of N-phthaloyl-cephalosporin C are covered with 10 ml of 2:3-dihydro-4-pyrane, cooled with a mixture of ice and sodium chloride to $-10°$ C and treated with stirring with 50 mg of para-toluenesulfonic acid and after 20 minutes with a further 50 mg of para-toluenesulfonic acid. Stirring is continued for 3 hours in a cold bath with the exclusion of moisture, the batch is diluted with 20 ml of dioxan and poured in a thin jet into an ice-cold, vigorously stirred phosphate buffer of about 10 percent strength having a pH value of 9.5. The aqueous phase freed from the organic solvent in vacuo is extracted with a mixture of benzene and ethyl acetate (5:2). The extract is rendered alkaline by the addition of 5 ml of pyridine, dried over sodium sulfate and evaporated in vacuo to yield a neutral crude product which is freed from contaminants by being digested with mixtures of petroleum ether and ether (first 98:2 and then 3:1) containing pyridine of 1% strength in which mixtures the contaminants are soluble. 2.36 g of N-phthaloyl-cephaosporin C-di-tetrahydropyranyl ester are obtained. In the thin-layer chromatogram on silica gel in the system benzene+acetone (7:3) the compound shows an $R_f$ value of 0.40. The infrared absorption spectrum in methylene chloride displays, inter alia, bands at 5.64, 5.75, 5.82, 5.91, 7.27, 7.41, 8.35, 8.49, 8.86, 8.98, 9.08, 9.41, 9.48, 9.70, 10.65 and 11.60 m$\mu$.

EXAMPLE 15

When N-2:4-dinitrophenyl-cephalosporin C-di-paranitrophenyl ester is used as starting material in the process of Example 13, 7-amino-cephalosporanic acid paranitrophenyl ester is obtained. $R_f$ value in the paper chromatogram, system I = 0.26; yellow-brown coloration with ninhydrin-collidine or bioautographic identification with Staphylococcus aureus after sprinkling with 1-molar pyridine in acetone + water (1:1) and a 1 percent solution of phenyl-acetyl chloride in acetone. In the ultraviolet spectrum maximum at 263 m$\mu$ ($\epsilon$ = 7900).

The starting material may be prepared as follows:

15 g of N-2:4-dinitrophenyl-cephalosporin C are dissolved in 600 ml of absolute pyridine, treated with 8 g of para-nitrophenol and 20 g of N:N'-dicyclohexylcarbodimide and allowed to stand for 14 hours at 22° C. The dicyclohexylurea which has crystallized out is filtered off and evaporated in vacuo. The solution of the residue in 1 liter of ethyl acetate is washed with 2N-hydrochloric acid, water and saturated sodium chloride solution, dried over sodium sulfate, evaporated in vacuo, taken up in acetone and freed from further precipitated dicyclohexylurea by filtration. The evaporated filtrate (22.8 g) is chromatographed on 1 kg of silica gel. The fractions each eluted with 700 ml of benzene+chloroform (1:1) contain 8.49 g of yellow, amorphous N-2:4-dinitrophenyl-cephalosporin C-di-para-nitrophenyl ester. $R_f$ value in the thin-layer chromatogram on silica gel, system: chloroform+methanol (95:5) = 0.70. The infrared spectrum in Nujol displays, inter alia, bands at 5.63, 5.70, 5.85, 6.00, 6.16, 6.27, 6.56 and 7.44 μ.

EXAMPLE 16

In an analogous manner to that described in Example 13 N-phenylacetyl-cephalosporin C-monomethyl ester desacetyl lactone is treated to yield 7-amino-cephalosporanic acid desacetyl lactone already described.

The starting material may be prepared as follows:

1 g of N-phenylacetyl-cephalosporin C is dissolved in 20 ml of dioxan, treated with stirring with excess ethereal diazomethane solution and then allowed to stand for 30 minutes at 22° C. 0.5 ml of glacial acetic acid is added to the reaction mixture and evaporation is carried out in vacuo. A chloroform solution of the evaporation residue is washed neutral with N-hydrochloric acid, N-sodium bicarbonate and water, dried over sodium sulfate and evaporated to yield 972 mg of N-phenylacetyl-cephalosporin C-dimethyl ester.

506 mg of N-phenylacetyl-cephalosporin C-dimethyl ester are dissolved in 50 ml of a mixture of methanol and dioxan (3:1), treated with 1 ml of concentrated hydrochloric acid and allowed to stand for 2 ½ days at 2° C. The reaction mixture is then diluted with 60 ml of water and concentrated to about 40 ml in vacuo. The chloroform extract of the acidic aqueous phase is washed with N-sodium bicarbonate solution and water, dried over sodium sulfate and evaporated. 468 mg of evaporation residue are obtained which are chromatographed on 50 g of silica gel. The fractions eluted with a mixture of chloroform and methanol (98:2) contain N-phenyl-acetyl-cephalosporin C-monomethyl ester desacetyl lactone.

The infrared spectrum in Nujol displays a lactone band at 5.62 μ. Further bands are, inter alia, at 3.03, 3.37, 3.45, 5.57, 5.70, 5.93, 6.11, 6.36, 6.50, 6.85, 7.24, 7.57, 7,76, 7.95, 8.28, 8.47, 8.74, 8.93, 9.10, 9.23, 9.79, 10.11, 13.63μ; (the bands at 3.37, 3.45, 6.85, 7.24 and 13.63μ belong to Nujol). The compound is unitary according to the paper chromatogram (system: n-butanol+methanol+water 2:1:2; $R_f$= 0.88).

EXAMPLE 17

162 mg (0.296 millimol) of 7-[4-(1-phenyl-2-thiono-5-oxo-imidazolidine-4-yl)-butyryl]-amino-cephalosporanic acid methyl ester are allowed to stand for 6 days at 22° C in 11 ml of methylene chloride together with 237 mg (3.0 millimols) of pyridine and 154 mg (1 millimol) of phosphorus oxychloride. After the addition of 2 ml of absolute alcohol the batch is allowed to stand for another 8 hours, is treated with 1 ml of pyridine and evaporated in vacuo. The residue is hydrolyzed for 15 hours at 20° C with a mixture of 20 ml of dioxan and 10 ml of aqueous phosphoric acid of 3 percent strength. Working up in the manner described in Example 1 yields 7-amino-cephalosporanic acid methyl ester.

In an analogous manner the ethyl and n-butyl ester of 7-[4-(1-phenyl-2-thiono-5-oxo-imadazolidine-4-yl)-butyryl]-amino-cephalosporanic acid is converted into 7-amino-cephalosporanic acid ethyl ester and 7-amino-cephalosporanic acid n-butyl ester respectively.

The esters used as starting materials may be prepared as follows:

A solution of 15 grams of cephalosporin C in 150 ml of water and 150 ml of pyridine (at pH 7.5) is heated to 37° C and mixed with 11.9 ml of N-sodium hydroxide solution (at pH 9.0). 7.5 ml of phenyl isothiocyanate are then added, while keeping the temperature (37° C) and the pH value (9) constant by dropping in N-sodium hydroxide solution, of which 60 percent of the calculated amount are consumed within the first 10 minutes. After 70 minutes, 71 percent of the theoretical amount of sodium hydroxide solution has been consumed. The mixture is diluted with 400 ml of water and agitated 3 times with 1 liter of benzene on each occasion and once with 500 ml of ether. The aqueous phase is then adjusted to pH 1.7 with concentrated hydrochloric acid, the precipitate being dissolved by adding 600 ml of dioxan, and the whole is left to itself for 2 ½ hours at 22° C. The solution is slightly concentrated under vacuum and then again diluted with water and exhaustively extracted with ethyl acetate. The extracts are washed with saturated sodium chloride solution, dried over sodium sulfate and evaporated to yield 17.07 grams of residue. The colorless, amorphous 7-[4-(1-phenyl-2-thiono-5-oxo-imidazolidine-4-yl) butyryl]-amino-cephalosporanic acid is revealed by its paper-chromatogram (after bioautographic development with Staphylococcus aureus) to be unitary and has in the system n-butanol:methanol:water (2:1:2) an $R_f$ value of 0.68, and in the system n-butanol (saturated with water) glacial acetic acid (98:2) an $R_f$ value of 0.41. Inhibition zones of 1% solutions in acetone on paper roundels of 6 mm diameter: Staphylococcus aureus 24 mm; Bacillus subtilis 30 mm; Staphylococcus aureus, resistant to penicillin, 21 mm. The esters are obtained by alkylation of this acid with diazomethane, diazoethane or diazobutane, respectively, in an analogous manner to that described in Example 2.

EXAMPLE 18

29 ml of absolute pyridine are added to a solution of 26.3 g of crystalline N-phthalyl-cephalosporin C-dibenzhydryl ester in 1 liter of absolute methylenechloride, and the whole is cooled to −10°C. In the course of 2 minutes 187 ml of a 10% phosphorus pentachloride solution in absolute methylenechloride are then stirred in and the batch is stirred on for half an hour while maintaining the temperature all the time at −10° C. 200 ml of ice-cold absolute methanol are then rapidly (within one-half minute) added to the solution and the temperature is maintained for another 30 minutes at −10° C. The batch is then heated on a water bath at +20° C and stirred for 1 hour at this temperature. The solution is then rapidly (within one-half minute) mixed while being stirred with one-half liter of an ice-cold aqueous solution of 35 ml of 85 percent orthophosphoric acid and the mixture is stirred for 1 ½ hours at 20° C, adjusted to pH 8 with about 530 ml of 50 percent aqueous tri-potassium phosphate solution, and the bottom methylene chloride phase is separated. The aqueous upper phase is further extracted with one-half liter of methylene-chloride. The combined methylene extracts are dried over sodium sulfate and evaporated under vacuum, to yield 34 to 40g (depending on the degree of drying) of a liquid residue which is further dried for about 30 minutes at room temperature under 0.1mm Hg pressure. This residue contains the 7-amino-cephalosporanic acid benzhydryl ester which is taken up in 15ml of anisole and mixed with 45ml of trifluoroacetic acid while being cooled. The dissolution of the residue is accelerated by vigorous swirling of the vessel which is then kept for 15 minutes at about 20° C. The solution is then rapidly poured into 700ml of stirred, cold methanol, and at the same time the pH (pH meter) of the methanolic solution is adjusted to 3.5 by adding about 135ml of tri-n-butylamine. Subsequently, the Ph value is adjusted finely by diluting 0.5ml-specimens with 4.5ml of water each and then measuring these dilutions with the pH meter. The solution is cooled for 2 to 15 hours to +5° to +10° C and then filtered. The residue is washed successively with methanol, methylenechloride and ether and then dried under vacuum, to yield 6.68g (= 81 percent of the theoretical yield) of 7-amino-cephalosporanic acid. Ultraviolet absorption spectrum (in 0.1N-sodium bicarbonate solution): $\lambda_{max} = 263m\mu$ ($\delta = 8000$). Optical rotation $[(\epsilon]_D^{20} = +118°$ (c = 1, in 0.5N-sodium bicarbonate solution).

EXAMPLE 19

23ml of absolute pyridine are added to a solution of 26.3g of crystalline N-phthalyl-cephalosporin C-dibenzhydryl ester in 263ml of absolute methylenechloride, and the whole is cooled to −10° C. In the course of 2 minutes 150ml of a 10percent solution of phosphorus pentachloride in absolute methylenechloride are then stirred in and stirring is continued for one-half hour while maintaining all the time a temperature of −10° C. In the course of one-half minute the solution is rapidly mixed with 100ml of ice-cold absolute methanol and the temperature is maintained at −10° C for another 30 minutes. The batch is heated in a water bath to +20° C and stirred at this temperature for 1 hour. While stirring the solution it is then rapidly (within one-half minute) mixed with 250ml of ice-cold aqueous N-hydrochloric acid and stirred for three-fourths hour at 20° C.

50ml of 50 percent aqueous tri-potassium phosphate solution are then added and the pH value is adjusted to 8.0 with about 230ml of 2N-aqueous sodium hydroxide solution. From the mixture (which tends to emulsification) the methyl-enechloride layer is separated by centrifugation, and the aqueous phase is further extracted with 200ml of methylene-chloride. The methylenechloride extracts are combined, dried over sodium sulfate and evaporated under vacuum, to yield 34 to 38g (depending on the degree of drying) of a liquid residue which is further dried for about one-half hour under 0.1mm Hg pressure at room temperature. The residue contains the 7-amino-cephalosporanic acid as described in Example 18. This acid has the same degree of purity as the product of Example 18.

EXAMPLE 20

1,15kg of absolute pyridine are added to a solution of 1kg of crystalline N-phthalyl-cephalosporin C-di-benzhydryl ester in 30 liters of absolute methylenechloride, and the whole is cooled to 16° C. Within 10 minutes a solution of 730g of phosphorus pentachloride in 13 liters of absolute methylenechloride is then stirred in, during which the temperature rises to −13° C. The batch is stirred for 40 minutes at −12° C and then mixed within 3 minutes with 7.5 liters of absolute methanol (cooled to about −20° C), during which the temperature of the reaction mixture rises to −10° C. The batch is stirred for one-half hour at −10° C, heated in a water bath to +20° C and stirred on for 1 hour. The solution is then stirred into 25 liters of aqueous N-hydrochloric acid (about +10° C) and the mixture is stirred for 3/4 hour at 20°C, then mixed with 1.9 liters of 50 percent aqueous tri-potassium phosphate solution and adjusted to pH 8.0 with about 20 liters of aqueous 2N-sodium hydroxide solution. The phases are separated and the aqueous phase is further extracted with 12 liters of methylenechloride. The methylenechloride extracts are combined, dried over 2.5kg of sodium sulfate and evaporated under vacuum, to yield 1.33kg of residue which is taken up in 570ml of absolute anisole, cooled to −15° C and, with cooling, 1.66 liters of trifluoroacetic acid are stirred in within 7 minutes. The acid is allowed to react for a total of one-half hour, while maintaining the temperature at about 25° C. During the last 5 minutes finely dispersed 7-amino-cephalosporanic acid precipitates from the brownish solution. The solution is then rapidly poured into 20 liters of stirred methanol cooled at −10°C, while at the same time adding 2.7 liters of triethylamine. The speed of addition of the trifluoroacetic acid and of the triethylamine should be adjusted so that at no time is there an excess of triethylamine in methanol. The pH value of the mixture is then adjusted to 3.5 with a further 350ml of triethylamine. The batch is kept overnight at 0° to +5° C, filtered and the residue is washed by being suspended in the following solvents: 2 × 2 liters of methanol, 2 × 2 liters of methylenechloride and 2 × 2 liters of ether. After drying under vacuum at room temperature, there are obtained 271 g (=81.5 percent of theory) of 7-amino-cephalosporanic acid. Purity: 100% according to its ultraviolet absorption spectrum (in 0.1N-sodium bicarbonate solution, $\lambda_{max} = 261m\mu$, $\epsilon = 8500$). Specific rotation $[\alpha]_D^{20} = +114° \pm 1°$ (c = 1 in 0.5-n sodium bicarbonate).

EXAMPLE 21

2.23 g of 7-phenylacetylamino-cephalosporanic acid benzhydryl ester are dissolved in 100 ml of absolute methylene chloride. The solution is cooled to −20° C and treated with 1.55 ml of absolute pyridine and 12.3 ml of an 8 percent solution of phosphorus pentachloride in methylene chloride. After a reaction period of 15 minutes at −10° to −15° C, the solution is again cooled to −20° C and then treated with 24.2 ml of absolute methanol. The mixture is then allowed to warm up to room temperature, and allowed to stand for 1 hour. After that, it is poured into 450 ml of a 2:1 mixture of dioxan and 5 percent aqueous phosphoric acid, the methylene chloride is removed under reduced pressure until the solution is homogeneous. The solution is allowed to stand at 22° C for 1 hour, then diluted with 50 ml of water, and the dioxan is evaporated under reduced pressure. The aqueous phase is treated with 70 ml of ethanol and the mixture extracted three times with a 5:2 mixture of benzene and ethyl acetate. The organic phases are washed four times with a 1:1 mixture of 2N-hydrochloric acid and ethanol. The aqueous phases are combined and the pH adjusted to 6. The batch is freed from alcohol under reduced pressure and extracted with ethyl acetate at a pH value of 8. The ethyl acetate extract is dried over sodium sulfate and evaporated to obtain 1.45 g (83 percent of the theory) of 7-aminocephalosporanic acid-benzhydryl ester. The substance crystallizes from ether in the form of needles which melt at 126° – 127° C. In the UV spectrum in methylene chloride $\lambda_{max} = 264$ nm ($\epsilon = 7300$). $[\alpha]_D^{20} = +4° \pm 1°$ (c = 1 in chloroform). In the thin-layer chromatogram on silica gel in the system ethyl acetate (1:1), Rf = 0.31, in toluene+acetone (7:3), Rf = 0.39. 438 mg (1 mmol) of 7-amino-cephalosporanic acid-benzhydryl ester are dissolved in 5 ml of anisol, the solution treated with 20 ml of anhydrous trifluoroacetic acid and, after 5 minutes, rapidly evaporated under a pressure of 0.1 mm of Hg. The residue is dissolved in ethyl acetate and the solution extracted with 1 percent aqueous trifluoroacetic acid. From the aqueous phase which is adjusted to a pH of 3.5 with pyridine, then concentrated to a small volume under reduced pressure, 248 mg (= 91 percent of the theoretical quantity) of 7-amino-cephalosporanic acid separate out. According to the thin-layer chromatogram, (on silica gel using the system n-butanol-pyridine-glacial acetic acid-water (30:20:6:24); Rf : 0.45; brown coloration with ninhydrin-collidine), this acid is unitary and is identical with authentic material. In the microbiological plate test (Staphylococcus aureus) equal inhibition zones are obtained after phenyl-acetylation. The 7-phenylacetylamino-cephalosporanic acid-benzhydryl ester used as starting materil can be produced as follows: 776 mg of diphenyldiazomethane in 12 ml of dioxane are added to a solution of 780 mg of 7-phenylacetylaminocephalosporanic acid in 16.5 ml of dioxan. The purple-violet reaction solution is allowed to stand in the dark at 22° C for 5 hours. The then only slightly pink-colored solution is evaporated under reduced pressure, the residue dissolved in 200 ml of chloroform, the chloroform solution washed twice with ice-cold 5 percent phosphoric acid, with water, three times with ice-cold N-sodium bicarbonate, and finally with 10 percent sodium chloride solution. The chloroform solution is then dried over sodium sulfate and evaporated to dryness under reduced pressure. The residue is triturated with ether, then recrystallized from methylene chloride+cyclohexane. The fine colorless needles obtained melt at 113°–114° C.

EXAMPLE 22

1.96 g of desacetoxy-7-phenylacetylaminocephalosporanic acid-benzhydryl ester are dissolved in 100 ml of absolute methylene chloride. The solution is cooled to −20° C and treated with 1.55 ml of absolute pyridine and 12.3 ml of an 8% solution of phosphorus pentachloride in methylene chloride. After a reaction period of 15 minutes at −10° to −15° C, the solution is again cooled to −20° C and then treated with 24.2 ml of absolute methanol. The mixture is then allowed to warm up to room temperature, and allowed to stand for 1 hour. After that, it is poured into 450 ml of a 2:1 mixture of dioxan and 5 percent aqueous phosphoric acid, the methylene chloride is removed under reduced pressure until the solution is homogeneous. The solution is allowed to stand at 22° C for 1 hour, then diluted with 50 ml of water, and the dioxan is evaporated under reduced pressure. The aqueous phase is treated with 70 ml of ethanol and the mixture extracted three times with a 5:2 mixture of benzene and ethyl acetate. The organic phases are washed four times with a 1:1 mixture of 2N-hydrochloric acid and ethanol. The aqueous phases are combined and the pH adjusted to 6. The batch is freed from alcohol under reduced pressure and extracted with ethyl acetate at a pH value of 8. The ethyl acetate extract is dried over sodium sulfate and evaporated to obtain 1.25 g of desacetoxy-7-aminocephalosporanic acid-benzhydryl ester. The latter is dissolved in 5 ml of anisole, the solution treated with 20 ml of anhydrous trifluoroacetic acid and, after 5 minutes, rapidly evaporated under a pressure of 0.1 mm of Hg. The residue is dissolved in ethyl acetate and the solution extracted with 1 percent aqueous trifluoroacetic acid. From the aqueous phase which is given a pH of 3.5 with triethylamine, then concentrated under reduced pressure to a small volume, and allowed to stand in an ice bath for 2 hours, 790 mg of desacetoxy-7-amino-cephalosporanic acid separate out. The substance is unitary according to thin-layer chromatography (using the system n-butanol-pyridine-glacial acetic acid-water (30:20:6:24); Rf = 0.48). In the ultraviolet spectrum in 0.1N-sodium bicarbonate it exhibits a maximum at $\lambda = 263$ nm ($\epsilon = 8000$). In the IR spectrum it shows no absorption either at 5.75 or 8.13m$\mu$.

The desacetoxy-7-phenylacetylaminocephalosporanic acid-benzylhydryl ester can be prepared by the process described by Orin et al. (J.Am. Chem. Soc. 85, 1896 [1963] by reacting benzylpenicillin-1-oxide benzhydryl ester with a catalytic quantity of anhydrous para-toluenesulfonic acid in xylene at 145° C for 10 minutes. The crude product is purified by chromatography on silica gel and elution with methylene chloride+2 percent ethyl acetate. The ester is recrystallized from methylene chloride+cyclohexane and then melts at 178°–179° C. $[\alpha]_D^{20} = 23° \pm 1°$ (c = 1.1 in chloroform). In thin-layer chromatography on silica gel using the system toluene+acetone (3:1), Rf = 0.61. In the UV spectrum in 95 percent ethanol a maximum appears at $\lambda = 258 - 259$ nm ($\epsilon = 6700$).

EXAMPLE 23

2.75 g of at most 91.5 percent pure phthalylcephalosporine C [ultra-violet: $\lambda_{max} = 263$m$\mu$ ($\epsilon = 7,600$) in 95 percent strength ethanol] are suspended in 150 ml of chloroform and dissolved by brief stirring with 1.26 ml of absolute pyridine. After adding 4.42 ml of tri-n-butyl-tin chloride the slightly yellowish-colored solution is allowed to stand overnight at room temperature.

It is then cooled to below −20° C and 5.43 ml of absolute pyridine are added, followed by 44.3 ml of an 8 percent strength solution of phosphorus pentachloride in absolute methylene chloride. The mixture is stirred for 40 minutes at −12° C. After renewed cooling to below −20° C, 60.6 ml of absolute methanol are allowed to run in over the course of a few minutes. After 30 minutes at −10° C and a further 30 minutes reaction time at room temperature a clear golden yellow solution is obtained.

For purposes of hydrolysis, 10 ml of 25 percent strength aqueous formic acid are added and the pH-value is raised from 1.6 to 2.0 by adding 1.4 ml of triethylamine. After about 20 minutes' stirring at room temperature a fine precipitate begins to separate out. After 2 ½ hours the pH of the suspension is raised to 3.3 by adding a further 9 ml of triethylamine and the mixture is allowed to stand for 90 minutes in an ice bath. The precipitate is filtered off, washed with methanol, methylene chloride and ether and dried in a high vacuum. The resulting colorless 7-ACA, which in the ultra-violet (in 0.1 N NaHCO₃) shows an extinction coefficient at 263 mμ of 8,450, cannot be distinguished from authentic 7-ACA by thin layer chromatography.

EXAMPLE 24

10 ml of absolute pyridine are added to a solution of 8.1 g of N-phthalyl-cephalosporin C-ditrichlorethylester in 300 ml of methylene chloride and then, in a manner analogous to that described in Example 20, a solution of 6.4 g of phosphorus pentachloride in 110 ml of methylene chloride is stirred in. In a manner analogous to that of Example 20 the iminoether is formed with 65 ml of methanol. The imino-ether is hydrolyzed as in Example 20 with 220 ml of 1 N hydrochloric acid and the batch worked up as in Example 20. There are obtained 4.3 g of 7-amino-cephalosporanic acid-trichlorethylester which, according to UV analysis, has a purity of about 79 percent. That product is dissolved in 70 ml of aqueous acetic acid of 90 percent strength. To the solution are added in portions with vigorous stirring at 20° within 30 minutes 25 g of zinc dust. After stirring for another two hours, the mixture is centrifuged and the resulting clear solution evaporated. The residue is triturated several times with methanol to yield pure 7-amino-cephalosporanic acid. The starting material can be prepared as follows:

A solution of 4.1 g of dicyclohexylcarbodiimide in 30 ml of acetonitrile is added, at 20°, to a solution of 5.5 g of N-phthalyl-cephalosporin C in 70 ml of acetonitrile and the whole is stirred, with exclusion of moisture, for 1 hour and a half at 20° C. 60 ml of 2,2,2-trichlorethanol are added and stirring continued for 48 hours at 20° C. Then the batch is evaporated, the residue taken up in ethyl acetate and the solution extracted with aqueous phosphoric acid of 10 percent strength and then with 0.5M-dipotassium-hydrogenphosphate solution. After drying over sodium sulfate and evaporation there is obtained a crude product which is chromatographed on the thirty-fold amount of silica gel. The ester is eluted with mixtures of benzene and ethyl acetate with increasing content of ethyl acetate. The N-phthalyl-cephalosporin C-ditrichlorethyl ester is pure enough for further reaction.

EXAMPLE 25

To a solution of 2.8 g of cephalosporin C-dibenzyl ester in 130 ml of absolute methylene chloride are added 5.6 ml of pyridine and, within 5 minutes at −20° C and under nitrogen, 36.5 ml of phosphorus pentachloride of 10 percent strength. Stirring is continued for 45 minutes at −10° C, then 30 ml of methanol are added and stirring is continued for a further 30 minutes at −10° C and for 60 minutes at + 20° C. Then 100 ml of 1-N. hydrochloric acid are added. After stirring an hour at +10° C the pH is adjusted to 7.2 with tripotassium phosphate solution of 50 percent strength, and the mixture is extracted with methylene chloride. The methylene chloride solution is dried with sodium sulfate and then evaporated. There are obtained 3.1 g of 7-amino-cephalosporanic acid benzyl ester (74 percent of the theory).

The diester used as starting material can be prepared as follows:

3.5 g of N-tert.butyloxycarbonyl-cephalosporin C-dibenzyl ester (prepared from N-tert.butyloxycarbonyl-cephalosporin C with diazomethane; m.p.87°–88° C) are dissolved in 40 ml of trifluoracetic acid, the solution is kept for 5 minutes at room temperature and then evaporated under reduced pressure, the residue dissolved in chloroformether (1:3), washed with 0.5 molar-dipotassiumhydrogenphosphate solution, the organic phase dried over soldium phosphate and evaporated.

We claim:

1. In a process for splitting the 7-N-acyl group from a compound of the formula I

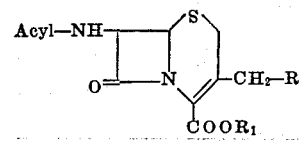

in which R represents at atom or group which does not take part in the reaction, $COOR_1$ is a carboxyl group, blocked to convert it into a group not reacting with the acid halide used for forming the imide halide and Acyl is the acyl residue of a carboxylic acid, the step which comprises reacting, in the presence of a tertiary amine, a compound of the formula I with an acid halide forming an imide halide, converting the imide halide into the iminoether by means of a member selected from the group consisting of a lower alkanol and a phenyl-lower alkanol and splitting the C=N double imino bond with a compound containing a hydroxy group.

2. A process as claimed in claim 1, wherein in the starting compound of formula I R stands for the acetoxy group.

3. A process as claimed in claim 1, wherein in the starting compound of formula I the acyl radical is the blocked α-aminoadipoyl group.

4. A process as claimed in claim 3, wherein the α-amino group of the α-aminoadipoyl group is blocked by N,N-phthaloyl.

5. A process as claimed in claim 1, wherein in the starting compound of formula I the blocked 4-carboxyl group $COOR_1$ is an esterified carboxyl group which can be split off in an acidic or neutral or weakly basic (up to pH 9) reaction medium.

6. A process as claimed in claim 2, wherein in the starting compound of formula I the acyl radical is the blocked α-aminoadipoyl group.

7. A process as claimed in claim 6, wherein the α-amino group of the α-aminoadipoyl group is blocked by N,N-phthaloyl.

8. A process as claimed in claim 2, wherein in the starting compound of formula I the blocked 4-carboxyl group $COOR_1$ is an esterified carboxyl group which can be split off in an acidic or neutral or weakly basic (up to pH 9) reaction medium.

9. A process as claimed in claim 5, wherein in the starting compound of formula I OR₁ is the radical of benzhydryl alcohol.

10. A process as claimed in claim 5, wherein in the starting compound of formula I OR₁ is the radical of stannyl alcohol.

11. A process as claimed in claim 1, wherein an acid halide derived from phosphorus, sulfur, carbon or their oxygen acids is used as agent forming an imide halide.

12. A process as claimed in claim 1, wherein phosphorus pentachloride is used as the acid halide forming an imide halide.

13. A process as claimed in claim 1, wherein phosphorus oxychloride is used as the acid halide forming an imide halide.

14. A process as claimed in claim 1, wherein phosphorus trichloride is used as the acid halide forming an imide halide.

15. A process as claimed in claim 1, wherein the reaction with an acid halide forming an imide halide is carried out in the presence of pyridine.

16. A process as claimed in claim 1, wherein the imide halide is converted into an iminoether by means of a lower alkanol.

17. A process as claimed in claim 1, wherein the imide halide is converted to the iminoether by means of methanol.

18. A process as claimed in claim 1, wherein the reaction to form the iminoether is carried out in the presence of pyridine.

19. A process as claimed in claim 1, wherein the iminoether is split by hydrolysis at a pH from 0 to 4.

20. In a process for splitting the 7-N-acyl group from a compound of the formula I

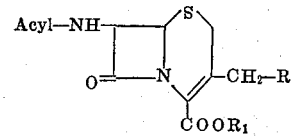

in which R represents an atom or group which does not take part in the reaction, COOR₁ is a carboxyl group, blocked to convert it into a group not reacting with the acid halide used for forming the imide halide and Acyl is the acyl residue of a carboxylic acid, the step which comprises reacting, in the presence of a tertiary amine, a compound of the formula I with an acid halide forming an imide halide.

21. A process as claimed in claim 20, wherein in the starting compound of formula I R stands for the acetoxy group.

22. A process as claimed in claim 20, wherein in the starting compound of formula I the acyl radical is the blocked α-aminoadipoyl group.

23. A process as claimed in claim 22, wherein the α-amino group of the α-aminoadipoyl group is blocked by N,N-phthaloyl.

24. A process as claimed in claim 20, wherein in the starting compound of formula I the blocked 4-carboxyl group COOR₁ is an esterified carboxyl group which can be split off in an acidic or neutral or weakly basic (up to pH 9) reaction medium.

* * * * *

PO-1050
(5/69)

UNITED STATES PATENT OFFICE
CERTIFICATE OF CORRECTION

Patent No. 3,697,515                    Dated October 10, 1972

Inventor(s) Bruno Fechtig et al

It is certified that error appears in the above-identified patent and that said Letters Patent are hereby corrected as shown below:

Column 1, line 14, "Referred" should be --- Preferred ---.

Column 2, line 35, after "formation", "or" should be --- of ---.

Column 5, line 50, "phtphaloyl" should be --- phthaloyl ---.

Column 7, line 33, "(α-lactam)" should be --- (β-lactam) ---; line 35, delete "6.70" (second occurrence); line 50, "acetene" should be --- acetone ---.

Column 11, line 6, "or" should be --- of ---.

Column 13, line 20, "chloride=petroleum" should be --- chloride+ petroleum ---; line 22, "$\varepsilon_{max}$" should be --- $\lambda_{max}$ ---.

Column 14, line 46 should read --- butanol+pyridine+glacial acetic acid+water ---; lines 56-58, delete "is converted into the 7-(β-chloroethylureido)-cephalosporanic acid benzyhydryl ester".

Column 16, line 28, "cephaosporin" should be --- cephalosporin ---.

Column 19, line 9, "Ph" should be --- pH ---; line 18, "($\delta$ = 8000)" should be --- ($\varepsilon$ = 8000) ---; line 19, "[($\varepsilon$]" should be --- [α] ---; line 59, "1,15" should be --- 1.15 ---.

Column 24, line 1 after the structural formula, "at" should be --- an ---.

PO-1050
(5/69)

UNITED STATES PATENT OFFICE
CERTIFICATE OF CORRECTION

Page - 2

Patent No. 3,697,515        Dated October 10, 1972

Inventor(s) Bruno Fechtig et al

It is certified that error appears in the above-identified patent and that said Letters Patent are hereby corrected as shown below:

Column 24, lines 50, 52, 61 and 63, in each delete "α-aminoadipoyl" and substitute --- δ-aminoadipoyl ---.

Column 26, lines 25 and 27, in each delete "α-aminoadipoyl" and substitute --- δ-aminoadipoyl ---.

Signed and sealed this 8th day of October 1974.

(SEAL)
Attest:

McCOY M. GIBSON JR.             C. MARSHALL DANN
Attesting Officer                 Commissioner of Patents